(12) United States Patent
Shao et al.

(10) Patent No.: US 10,839,318 B2
(45) Date of Patent: Nov. 17, 2020

(54) MACHINE LEARNING MODELS FOR EVALUATING DIFFERENCES BETWEEN GROUPS AND METHODS THEREOF

(71) Applicant: Capital One Services, LLC, McLean, VA (US)

(72) Inventors: Ruoyu Shao, McLean, VA (US); Fenglin Yan, McLean, VA (US); Vikramaditya Repaka, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/217,808

(22) Filed: Dec. 12, 2018

(65) Prior Publication Data

US 2020/0193321 A1 Jun. 18, 2020

(51) Int. Cl.
*G06N 20/00* (2019.01)
*G06N 5/04* (2006.01)
*G06T 11/20* (2006.01)

(52) U.S. Cl.
CPC .............. *G06N 20/00* (2019.01); *G06N 5/04* (2013.01); *G06T 11/206* (2013.01)

(58) Field of Classification Search
CPC ......... G06N 20/00; G06N 5/04; G06T 11/206
See application file for complete search history.

(56) References Cited

U.S. PATENT DOCUMENTS

| | | | | |
|---|---|---|---|---|
| 6,026,397 A | * | 2/2000 | Sheppard | G06F 16/355 |
| 9,418,337 B1 | * | 8/2016 | Elser | G06F 16/2468 |
| 2003/0233339 A1 | * | 12/2003 | Downs | G06Q 30/02 |

(Continued)

FOREIGN PATENT DOCUMENTS

WO   WO 2018077285 A1   5/2018

OTHER PUBLICATIONS

Xie, Yaya et al. "Customer churn prediction using improved balanced random forests" 2009 [Online] Downloaded Jul. 16, 2019 https://reader.elsevier.com/reader/sd/pii/S0957417408004326?token=73A2FB858D757AD3264E0007DD3397151135113CABC62D1B5E18613D2315142AB7B649F569A2956C709AB1F94AA4919A (Year: 2009).*

(Continued)

*Primary Examiner* — Ben M Rifkin
(74) *Attorney, Agent, or Firm* — Bookoff McAndrews, PLLC

(57) ABSTRACT

Systems, methods, and computer readable media are disclosed for generating, modifying, and using machine learning models to predict and evaluate differences between groups. Methods disclosed herein may include identifying variables that characterize members of a first group, generating shift indicators using the identified variables, generating a machine learning model using the shift indicators and the first group, using the machine learning model and the group to predict shifts between the first group and a predicted second group, determining an aggregate population shift and an aggregate performance shift between the first group and an actual second group, and identifying an impact of one or more of the shift indicators on the aggregate population shift or performance shift. Systems and methods disclosed herein may be configured to receive requests to predict and evaluate differences between group, and to return such predictions and evaluations to one or more users.

19 Claims, 6 Drawing Sheets

(56) References Cited

U.S. PATENT DOCUMENTS

| | | | |
|---|---|---|---|
| 2004/0059670 A1* | 3/2004 | Mills .................... | G06Q 40/025 |
| | | | 705/38 |
| 2004/0138958 A1* | 7/2004 | Watarai ................. | G06Q 30/02 |
| | | | 705/7.31 |
| 2004/0267599 A1* | 12/2004 | Heires .................... | G06Q 10/06 |
| | | | 705/400 |
| 2009/0164274 A1* | 6/2009 | Narayanaswamy ... | G06Q 10/06 |
| | | | 705/70 |
| 2016/0019218 A1* | 1/2016 | Zhang ................ | G06F 16/2457 |
| | | | 707/727 |

OTHER PUBLICATIONS

Pedregosa, Fabian. "Hyperparameter optimziation with approximate gradient" 2016 [Online] Downloaded Jul. 16, 2019 https://pdfs.semanticscholar.org/ad85/8283ce76aea1879a3585c0c914abce50ec2c.pdf (Year: 2016).*

"Understand How Artificial Intelligence and Machine Learning Can Enhance Your Business" Posted on Mar. 1, 2018 by Idexcel Technologies (5 pages).

"Is Machine Learning the best way to make the most in Finacen?" Maruti Techlabs Pvt. Ltd. (11 pages).

Hongri Jia, "Bank Loan Default Prediction with Machine Learning"—Passion for Data Science—Medium, (6 pages).

* cited by examiner

MACHINE LEARNING MODELS FOR EVALUATING DIFFERENCES BETWEEN GROUPS AND METHODS THEREOF

TECHNICAL FIELD

Various embodiments of the present disclosure relate generally to predicting and evaluating differences between two or more groups or populations, and more specifically to generating machine learning models for predicting and evaluating differences between two or more groups or populations.

BACKGROUND

Predicting and evaluating differences between two or more groups (e.g., multiple populations of individuals, companies, or families, multiple groups of data points, a single group of data points at multiple different periods of time, etc.) may have various beneficial applications across a wide variety of industries. For example, predicting and evaluating the differences between populations who take out different types of loans may be useful to, e.g., lenders, financial institutions, investors, and the like. Traditional methods for predicting and evaluating reasons for differences between two groups may involve a laborious manual processes, such as hand-picking potential reasons for differences, and may require statistical assumptions and/or time-consuming processes (e.g., process times of up to two weeks). Therefore, both accuracy and efficiency in such predictions and evaluations may be sub-optimal.

The present disclosure is directed to addressing one or more of these above-referenced challenges. The background description provided herein is for the purpose of generally presenting the context of the disclosure. Unless otherwise indicated herein, the materials and information described in this section are not prior art to the claims in this application and are not admitted to be prior art, or suggestions of the prior art, by inclusion in this section.

SUMMARY

According to certain aspects of the present disclosure, computer-implemented methods for generating a machine learning model to define differences between two groups are described. Each of the examples disclosed herein may include one or more of the features described in connection with any of the other disclosed examples.

According to some exemplary aspects of the present disclosure, computer-implemented methods described herein may include generating a plurality of shift indicators using variables defining members of a first group, generating a machine learning model using the plurality of shift indicators and the first group, and modifying the machine learning model using a plurality of hyperparameters identified for the machine learning model to generate a modified machine learning model. In some exemplary aspects of the present disclosure, computer-implemented methods described herein may further include, using the modified machine learning model and the first group, determining a predicted population shift and a predicted performance shift between the first group and a predicted second group, using one or more of the plurality of shift indicators, the first group, and an actual second group, determining an actual population shift and an actual performance shift between the first group and the actual second group, using a difference between the predicted population shift and the actual population shift, determining an aggregate population shift, and using a difference between the predicted performance shift and the actual performance shift, determining an aggregate performance shift. In some exemplary aspects of the present disclosure, computer-implemented methods described herein may further include outputting the aggregate population shift and the aggregate performance shift.

In some exemplary aspects of the present disclosure, variables defining members of a first group may include at least one of geographic locations, response rates, satisfaction rates, or loss percentages. In some exemplary aspects, generating a plurality of shift indicators using variables defining members of a first group may include at least one of transforming a single variable into one or more binary variables, or sorting members of the first group into sub-groups based on similarities between variables defining the members of each sub-group. In some exemplary aspects, the machine learning model may be one of a gradient boosting model or a random forest model.

In some exemplary aspects, computer-implemented methods of the present disclosure may include estimating, for a first shift indicator of the plurality of shift indicators, a coefficient of impact on the aggregate population shift, and using the aggregate population shift and the estimated coefficient of impact for the first shift indicator, determining an impact of the first shift indicator on the aggregate population shift. In some exemplary aspects of the present disclosure, computer-implemented methods may include comparing the impact of the first shift indicator on the aggregate population shift with an impact of at least one other shift indicator on the aggregate population shift, and, if the impact of the first shift indicator is greater than the impact of the at least one other shift indicator, outputting the first shift indicator. In some exemplary aspects of the present disclosure, computer-implemented methods may include identifying an impact of a first shift indicator of the plurality of shift indicators on the aggregate performance shift. In some exemplary aspects of the present disclosure, computer-implemented methods may include comparing the impact of the first shift indicator on the aggregate performance shift with an impact of at least one other shift indicator on the aggregate performance shift, and, if the impact of the first shift indicator is greater than the impact of the at least one other shift indicator, outputting the first shift indicator.

In some exemplary aspects of the present disclosure, outputting the aggregate population shift and the aggregate performance shift may include automatically generating a waterfall chart on a display, the waterfall chart including representations of the aggregate population shift and the aggregate performance shift. In some exemplary aspects of the present disclosure, the plurality of hyperparameters may be generated using at least one of cross-validation or early stopping on the machine learning model.

According to some exemplary aspects of the present disclosure, computer-implemented methods for generating a machine learning model to define aggregate changes between two groups are described. In some exemplary aspects of the present disclosure, the computer-implemented methods may include identifying a plurality of variables defining members of each of a first group and a second group, transforming the plurality of variables into a plurality of shift indicators, generating a machine learning model using the plurality of shift indicators and the first group, identifying a plurality of hyperparameters for the machine learning model, and modifying the machine learning model using the plurality of hyperparameters to generate a modified machine learning model. In some exemplary aspects of the present disclosure, the computer-implemented methods may include, using the modified machine learning model and the first group, predicting a population shift and a performance shift between the first group and a predicted second group, using one or more of the plurality of shift indicators, the first group, and the second group, determining an actual population shift and an actual performance shift between the first group and the second group, using a difference between the predicted population shift and the actual population shift, determining an aggregate population shift, and using a difference between the predicted performance shift and the actual performance shift, determining an aggregate performance shift. In some exemplary aspects of the present disclosure, the computer-implemented methods may include estimating a coefficient of impact on the aggregate population shift for a first shift indicator of the plurality of shift indicators, using the aggregate population shift and the estimated coefficient of impact on the aggregate population shift, determining a first impact of the first shift indicator on the aggregate population shift, outputting the first shift indicator and the first impact of the first shift indicator on the aggregate population shift, determining a second impact of a second shift indicator of the plurality of shift indicators on the aggregate performance shift, and outputting the second shift indicator and the second impact of the second shift indicator on the aggregate performance shift.

In some exemplary aspects of the present disclosure, identifying the plurality of hyperparameters for the machine learning model may include using cross-validation and early stopping for the machine learning model. In some exemplary aspects of the present disclosure, estimating a coefficient of impact on the aggregate population for a first shift indicator of the plurality of shift indicators may include simulating a sample aggregate performance shift in a sample set of the second group, wherein the sample set of the second group exhibits a change from a sample set of the first group, the change being associated with the first shift indicator. In some exemplary aspects of the present disclosure, determining a first impact of the first shift indicator of the plurality of shift indicators on the aggregate population shift may include multiplying the aggregate population shift by the estimated coefficient of impact on the aggregate population shift. In some exemplary aspects of the present disclosure, calculating a second impact of a second shift indicator of the plurality of shift indicators on the aggregate performance shift may include determining a sample aggregate performance shift in a sample set of the second group, wherein the sample set of the second group exhibits a change from a sample set of the first group, the change being associated with the second shift indicator.

In some exemplary aspects of the present disclosure, the first group and the second group may include at least one of a population of persons responding to a questionnaire, a population of persons responding to a campaign, a population of persons refinancing a loan, a population exhibiting a loss of monetary assets over a period of time, or a control population. In some exemplary aspects of the present disclosure, the plurality of variables defining members of each of a first group and a second group includes at least one hundred variables. In some exemplary aspects of the present disclosure, the plurality of shift indicators comprises binary shift indicators, Tweedie shift indicators, and continuous shift indicators. In some exemplary aspects of the present disclosure, the computer-implemented methods may further include measuring and logging performance of the modified machine learning model.

According to some exemplary aspects of the present disclosure, a non-transitory computer-readable medium storing instructions that, when executed by one or more processors of a computer system, may cause the one or more processors to perform a plurality of operations. In some exemplary aspects of the present disclosure, the plurality of operations may include identifying a plurality of variables associated with members of a first group, transforming the plurality of variables into a plurality of shift indicators, generating a machine learning model using the plurality of shift indicators and the first group, identifying a plurality of hyperparameters for the machine learning model, and modifying the machine learning model using the plurality of hyperparameters to generate a modified machine learning model. In some exemplary aspects of the present disclosure, the plurality of operations may include, using the modified machine learning model and the first group, predicting a population shift and a performance shift between the first group and a predicted second group, using one or more of the plurality of shift indicators, the first group, and an actual second group, determining an actual population shift and an actual performance shift between the first group and the actual second group, and, using a difference between the predicted population shift and the actual population shift and a difference between the predicted performance shift and the actual performance shift, determining an aggregate performance shift and an aggregate population shift. In some exemplary aspects of the present disclosure, the plurality of operations may include determining a first impact of a first shift indicator on the aggregate population shift by simulating a sample aggregate population shift in a first sample set of the actual second group, wherein the first sample set exhibits a change from a sample set in the first group, the change being associated with the first shift indicator, outputting the first shift indicator and the first impact of the first shift indicator on the aggregate population shift, determining a second impact of a second shift indicator on the aggregate performance shift by calculating a sample aggregate performance shift in a second sample set of the actual second group, wherein the second sample set exhibits a change from a sample set of the first group, the change being associated with the second shift indicator, and outputting the second shift indicator and the second impact of the second shift indicator on the aggregate performance shift.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
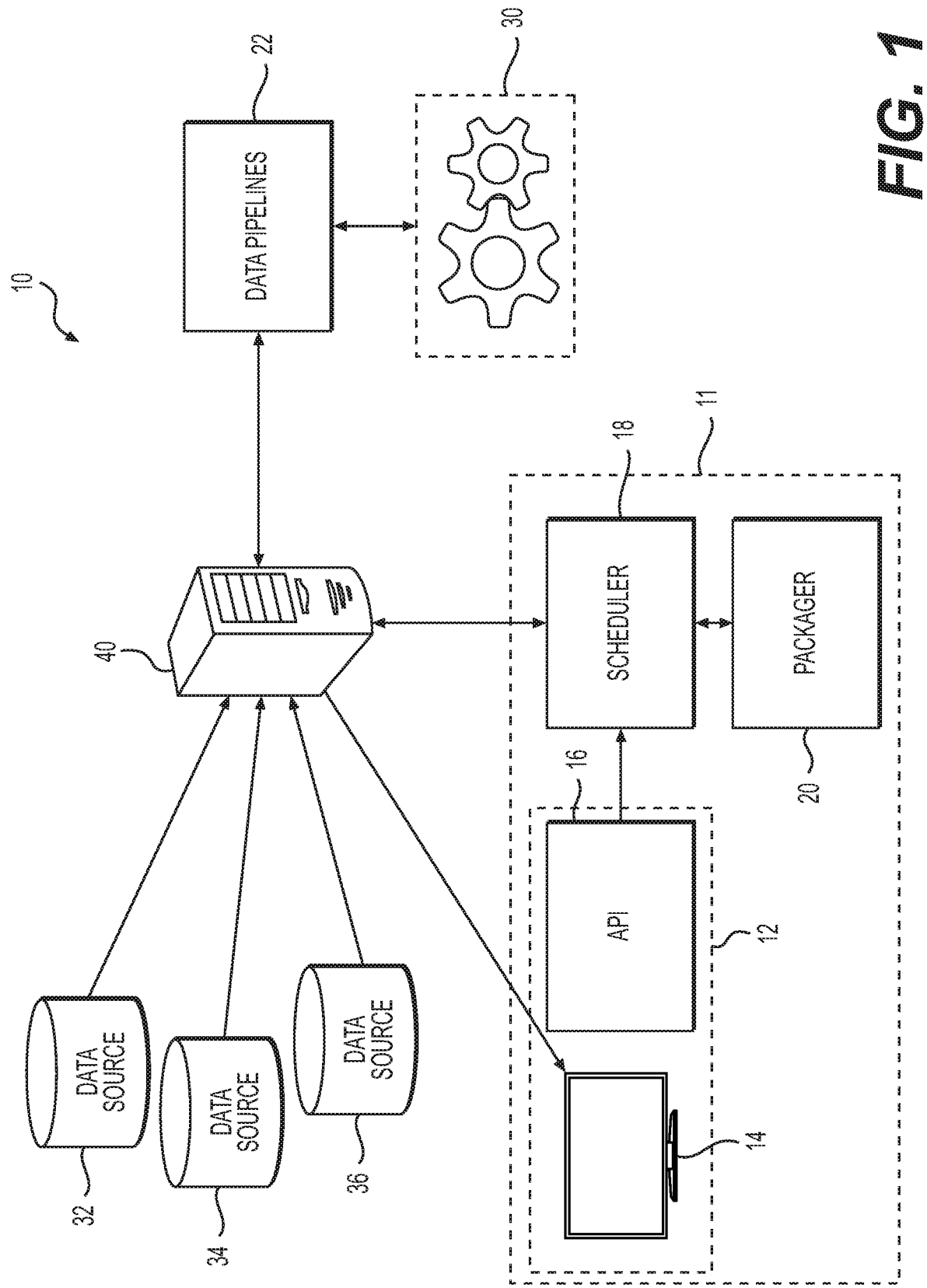
FIG. 1 illustrates, in schematic form, an exemplary system according to the present disclosure.

The terminology used in this disclosure is to be interpreted in its broadest reasonable manner, even though it is being used in conjunction with a detailed description of certain specific examples. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "using" means "using at least in part." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as "about," "approximately," "substantially," and "generally," are used to indicate a possible variation of ±10% of a stated or understood value.

The term "group" as used herein may refer to any plurality of entities, individuals, goods, records, data entries, etc. that may be characterized by one or more variables, and that have one or more variables in common with one another. Variables that characterize a member of a group may include, for example, any feature that describes the member of the group. Non-exclusive examples of variables that may characterize a member of a group may include a geographic location, a time period, a financial bracket, a particular event (e.g., birth, death, marriage, matriculation, graduation, promotion, retirement, hiring, dismissal from employment, bankruptcy etc.), a particular action (e.g., moving, buying, selling, taking out a loan, defaulting on a loan, responding to a survey, etc.), affiliation with an organization (e.g., being a member, customer, client, partner, or otherwise affiliated with, a company, organization, political group, etc.), a tax bracket, a place of employment, a type of employment, a gain or a loss (e.g., a financial gain or a financial loss), a response to a query (e.g., a poll, survey question, test question, quiz, etc.), and the like.

Aspects of the present disclosure are directed to solving problems that may arise when comparing two or more groups to one another, and when predicting and evaluating differences and similarities between those groups. In many practical applications of analyses, e.g., population analyses, census analyses, financial analyses and predictions, market analyses and predictions, etc., comparisons between, and analyses of, multiple groups are limited by multiple factors.

While aspects of the present disclosure may be described with respect to comparing two groups (e.g., a first group and a second group), it is contemplated that aspects of the present disclosure also may be applicable to comparisons between more than two groups.

Multiple approaches may be used when predicting and evaluating similarities and differences between groups. For example, machine learning is an automatable, adaptable tool that may provide accurate predictions as to expected differences and similarities between groups. However, machine learning often relies on black-box models, from which insights are difficult to extract. As another example, statistical inferences may assist in analyzing differences and similarities between groups. However, statistical inferences may require statistical assumptions by an individual user, as well as time-consuming calculations and processes which may limit the amount of data analyzed as a part of statistical inferences. As a further example, general analytics may contribute to an understanding of similarities and differences between groups. Analytics are a flexible tool; however, their manual nature results in an incomprehensive approach to understanding similarities and differences between groups.

The present disclosure is directed to combinations of the above approaches, as well as additional solutions, to provide improved modeling and prediction tools, which may take advantage of the positive aspects of these approaches to lead to improved insights and analyses of similarities and differences between multiple groups. For example, described herein are methods which include "binning" variables, or sorting variables into categories and transforming them into simplified, likely indicators of shifts between two groups ("shift indicators"). Binning variables may help to ensure that similar variables and members of groups are treated in a similar manner in, e.g., machine learning models, statistical inferences, and analytics. Moreover, binning may assist in preventing or reducing data loss that may occur when variables are directly used to build and modify machine learning models. As a further example, described herein are methods to integrate machine learning with statistical inferences to generate high-performance machine learning models that are specific to predictions and analyses based on particular groups and particular variables. By integrating statistical inferences with machine learning, the number of statistical assumptions needed may be reduced, and the time required to complete statistical analyses may be decreased. As yet another example, described herein are the use of hypothesis-free, "boil-the-ocean" algorithms in computer-implemented processes (e.g., processes relying upon predictions generated by machine learning models), which may reduce or eliminate the manual, incomprehensive downsides of traditional analytics. Eliminating manual analyses may enhance the accuracy and flexibility of predictions and analyses produced by the systems and methods disclosed herein.

The foregoing description of advantages provided by systems and methods of the present disclosure is exemplary, and does not foreclose the existence of many other advantages that aspects of the present disclosure may provide. Reference will now be made to the figures accompanying the present disclosure.

FIG. 1 illustrates a system 10 according to the present disclosure. System 10 may include a hub 40, data sources 32, 34, 36, and front-end components 11. Front-end components may include user interface components 12, such as a user device 14 and an application programming interface (API) 16. Front-end components also may include a scheduler 18, and a packager 20. System 10 may further include data pipelines 22 and modeling components 30.

System 10 may include computer hardware, computer software, and/or combinations of both. Aspects of system 10 may be located in similar or disparate locations. In some instances, for example, data sources 32, 34, 36, hub 40, each of front-end components 11, data pipelines 22, and modeling components 22 may each be in a separate physical location (e.g., on separate computer systems, in separate databases, or in separate geographic locations). In some instances, for example, data sources 32, 34, 36 may each belong to separate data providers located in separate geographical locations. In further instances, two or more of the aspects of system 10 may be located in the same physical location, e.g., on the same computer, in the same database, or in the same geographic location. For example, data sources 32, 34, 36 may all be located in one computer, in one computer system, or in one database. As a further example, in one embodiment, data sources 32, 34, 36 may be located remotely from hub 40, which in turn may be located remotely from front-end components 11.

Aspects and components of system 10 may be connected by wired or wireless connections. Some such connections are represented by the straight arrows connecting some of the aspects of system 10 in FIG. 1; however, it is contemplated that additional or different wired or wireless connections may exist between aspects of system 10. Wired or wireless connections between aspects of system 10 may include, for example, connections within a single machine, or wired or wireless connections over a local area network or a wide area network (e.g., the Internet). Furthermore, while aspects of system 10 are shown in FIG. 1, it is contemplated that system 10 may include more components, fewer components, and/or alternate or additional configurations of the depicted components.

Hub 40 may be, for example, a hardware and/or software component of system 10 configured to store data and/or receive and/or send data to and from other components of system 10. In some embodiments, for example, hub 40 may include an extensible data management system configured to receive data from some aspects of system 10 and transform said data into a format accessible and usable by other aspects of system 10. For example, hub 40 may include a database management system. In some embodiments, hub 40 may include one or more computers or computer systems configured to send, receive, and/or store data. For example, hub 40 may include one or more servers.

Data sources 32, 34, 46 may include one or more databases, storage systems, and/or inputs which may provide data describing groups, members of groups, and/or variables characterizing members of groups. For example, data sources 32, 34, 36 may include one or more cloud- or server-based databases, computers, computer systems, server systems, and/or cloud systems. Data may be provided to data sources 32, 34, 36 from any compatible source, via user or automated input (e.g., over a wired or wireless connection). Each of data sources 32, 34, 36 may receive, store, and/or provide data in a similar or different format. For example, data sources 32, 34, 36 may be configured to provide data to, e.g., hub 40 in a particular file format, such as a comma-separated values format (CSV) or other common file format. In some embodiments, hub 40 may be configured to pull or import data from data sources 32, 34, 36 and convert it to a specific format. Although three data sources (32, 34, 36) are depicted in system 10, it is contemplated that more or fewer data sources may be included in system 10.

Front-end components 11 may include user-facing aspects of system 10. As with hub 40, front-end components 11 may include hardware systems, software systems, or a combination of hardware and software systems. In some embodiments, some front-end components 11 may be, or may be located on, a single computer system, while in other embodiments, various front-end components 11 may be located on disparate computer systems. For example, in some embodiments, user device 14 may be geographically separated from, e.g., API 16, scheduler 18, and/or packager 20.

As noted above, user interface components 12 may include, for example, user device 14 and API 16. User device 14 may include, for example, a computing device configured to receive input from, and/or provide input to, an individual user, a client, an organization, or other entity. In some embodiments, for example, user device 14 may be configured to display a user interface on, e.g., a graphical or other display. Such a user interface may be programmed in any suitable language, such as, e.g., Java, and may be provided to user device 14 from a server. User device 14 may be, for example, a computing device affiliated with an individual, company, or other entity. For example, user device 14 may be a personal computer, a tablet, a smartphone, or other device having a processor.

API 16 may be an intermediary between, e.g., scheduler 18, hub 40 and user device 14. For example, API 16 may be a software intermediary configured to parse data to and/or from user device 14 and forward it to and/or from, e.g., scheduler 18 or hub 40. In some embodiments, for example, API 16 may be configured to take requests for data analyses or comparisons from user device 14, parse such requests, and/or forward such requests to scheduler 18 and/or hub 40.

Scheduler 18 may be, e.g., a software component of system 10 configured to schedule and queue requests for data analyses or comparisons received through, e.g., API 16 from user device 14. Scheduler 18 may additionally be configured to forward notifications (e.g., email notifications, text notifications, or other audio or visual notifications) to, e.g., API 16 or user device 14 upon completion of a data analysis or comparison. In some embodiments, for example, scheduler 18 may be, or may be disposed on, a hardware component separate from user device 14 and/or hub 40, and may interface with other aspects of system 10 via wired or wireless connections. In some embodiments, scheduler 18 may be a part of API 16.

Packager 20 may be, for example, a software component of system 10 configured to convert requests for data analyses or comparisons received through API 16 and forward them to hub 40 in a "packaged" data format which may be parsed by hub 40, data pipelines 22, and/or modeling components 30. In some embodiments, packager 20 may be a part of scheduler 18 and/or API 16.

Data pipelines 22 may be one or more software components of system 10 configured to pull data and code from hub 40 and forward it to modeling components 30, and to receive data from modeling components 30 and push received data back to hub 40. Data pipelines 22 may include, for example, code configured to compile data from hub 40 into a format recognizable by modeling components 30.

Modeling components 30 may be one or more hardware and/or software components that are configured to sort and analyze data, generate and modify machine learning models, identify similarities and differences between groups, and predict and analyze differences between groups using generated and modified machine learning models. In some embodiments, modeling components 30 may include a plurality of computing devices working in concert to perform data analyses and to predict and evaluate differences between data according to methods described further herein. Such computing devices may be any suitable computing devices, now-known or later-developed, capable of performing aspects of the processes and methods described herein. Modeling components 30 may be located in a single geographic area or multiple geographic areas, and may be connected to one another via, e.g., wired or wireless components. One or more portions of modeling components 30 may be configured to provide output to, e.g., data pipelines 22. In some embodiments, modeling components 30 may include one or more user input or user interface devices, and/or one or more monitoring/logging processes or components configured to monitor processes performed by modeling components 30.

Figure 2A:
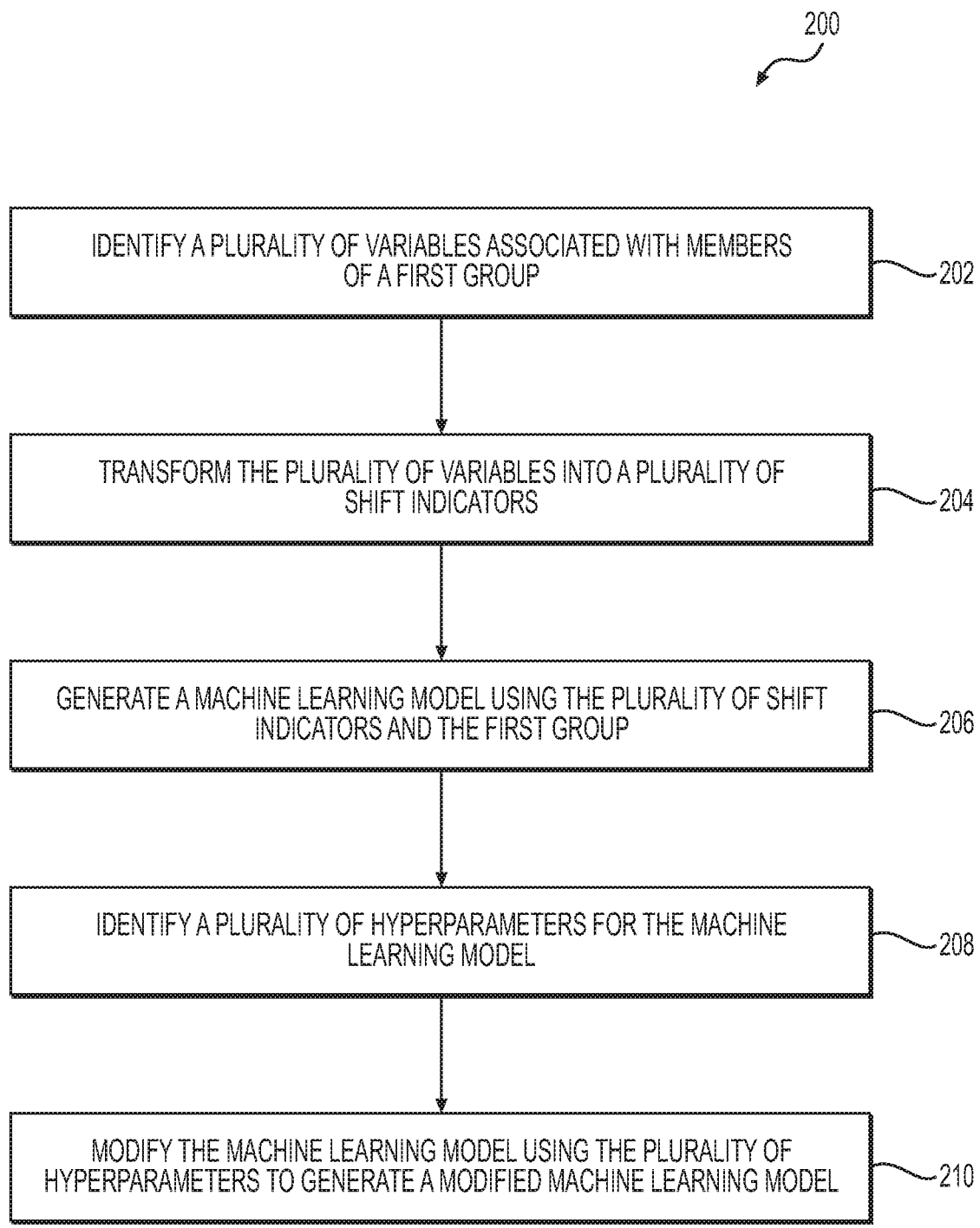
FIGS. 2A and 2B illustrate, in flow chart form, steps in a method for generating and using a machine learning model to predict and evaluate data, according to aspects of the present disclosure.
Figure 2B:
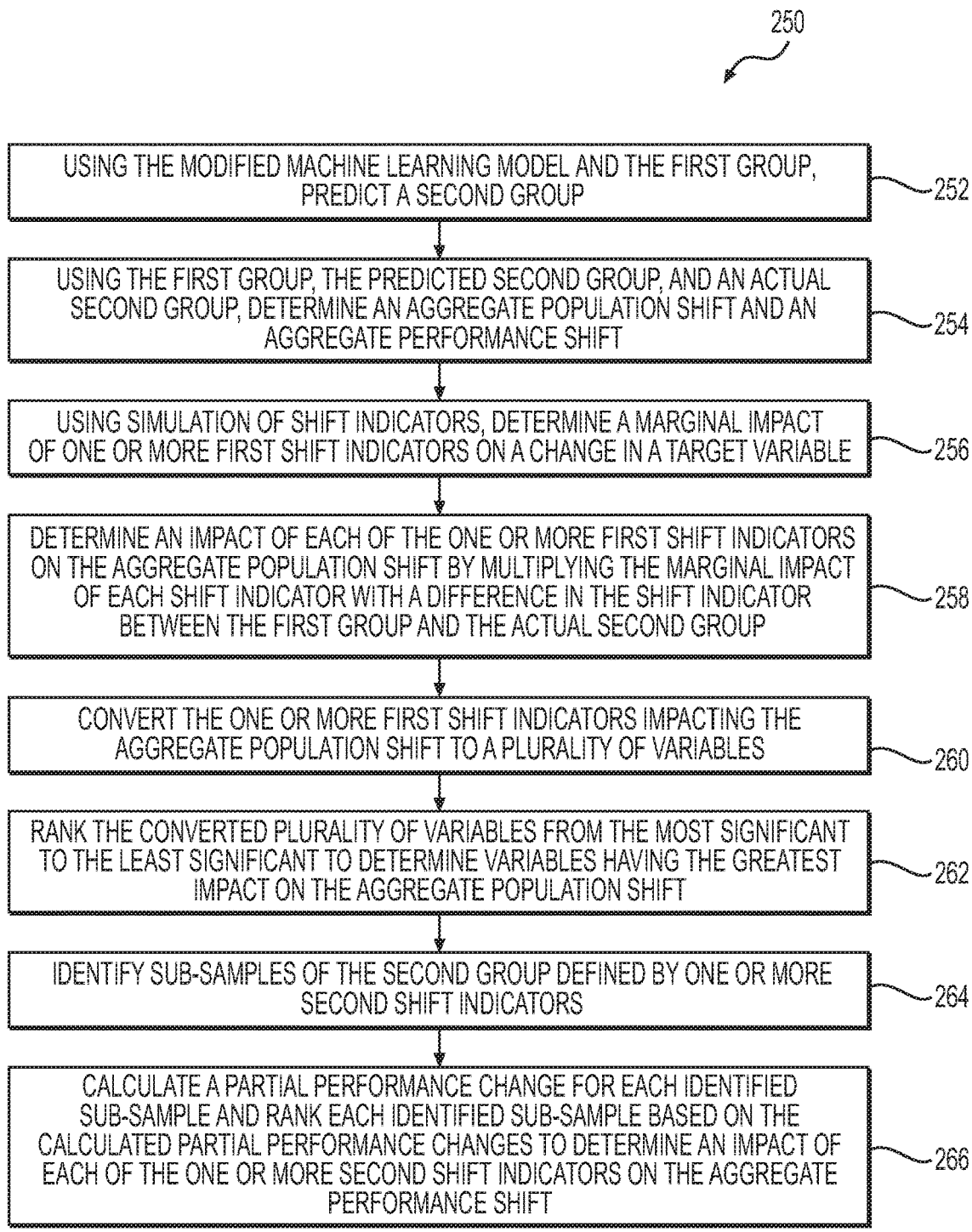
Figure 3:
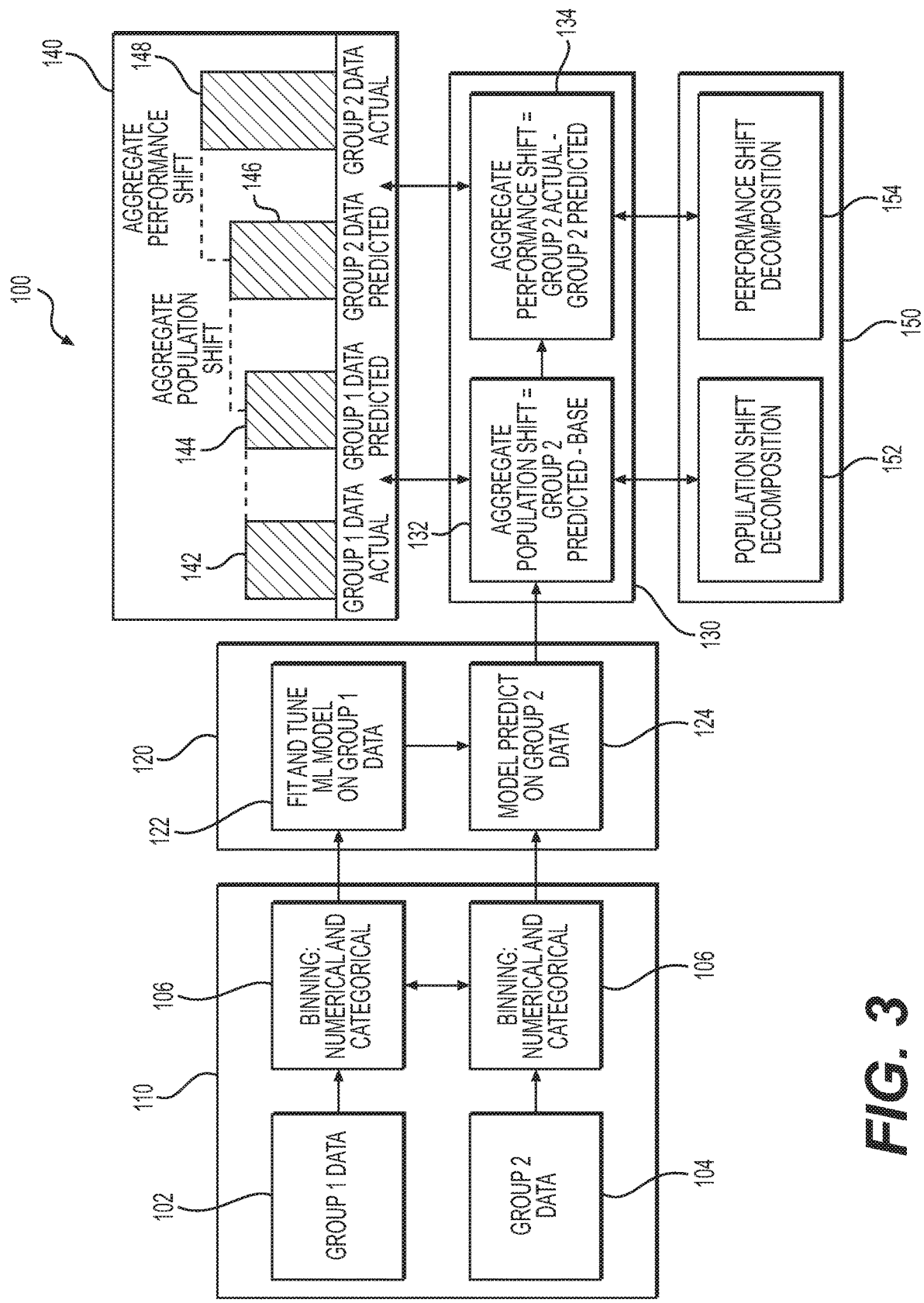
FIG. 3 depicts, in more detailed flow chart form, steps in a method for generating and using a machine learning model to predict and evaluate data according to aspects of the present disclosure.

FIGS. 2A, 2B, and 3 illustrate, in flow chart form, steps in methods for generating and using a machine learning model to predict and evaluate data, according to aspects of the present disclosure. These methods may be applied within, e.g., system 10, or within other suitable systems. The steps shown in FIGS. 2A and 2B may be performed consecutively as a part of a single method, or may be performed independently. Additionally, while FIGS. 2A, 2B, and 3 each illustrate an exemplary order of steps, it is contemplated that steps may be added, removed, and/or performed in an order different from the illustrated order.

FIG. 2A illustrates, in flow chart form, steps in a method 200 for generating and modifying a machine learning model, according to aspects of the present disclosure. According to step 202, a plurality of variables associated with members of a first group may be identified. Groups and variables that may characterize a group have been described elsewhere herein. The first group and the plurality of variables associated with members of the first group may be identified in various ways, e.g., depending on a desired analysis. For example, a desired analysis may relate to customer satisfaction with respect to a given retailer. The first group may include a population of customers of the retailer at or during a given time or time period. Exemplary variables in this example may include, e.g., customer satisfaction level as reported on a survey, customer return rate, an amount purchased, etc. As another example, a desired analysis may relate to monitoring loss over time. The first group may include, for example, a plurality of investments or loans, and variables associated with the group may include a time period, a loss percentage, a type of loan or investment, etc. Step 202 may be performed by, e.g., a user (e.g., a user of user device 14 in system 10), a packager (e.g., packager 20 of system 10), and/or a processor or component of a system configured to pull and store data from data sources, and configured to provide queries to, e.g., a modeling system (e.g., hub 40, configured to pull or receive data from data sources 32, 34, 36 and provide data to modeling components 30 via data pipelines 22).

According to step 204, the plurality of variables may be transformed into a plurality of shift indicators. Transforming the plurality of variables into a plurality of shift indicators may include a process referred to as "binning," or sorting variables into categories and transforming them into simplified, likely indicators of shifts between two groups ("shift indicators"). Binning may include, for example, transforming a categorical variable into a binary value, to generate a binary shift indicator. For example, a variable defining geographic locations (e.g., a state) may be transformed into a binary value to reflect a broader category of geographic locations. Binning also may include, for example, grouping variables based on percentiles. Numeric variables may be binned into percentile groups, e.g., based on the distribution of the numeric variables characterizing members of the group. In some embodiments, variables be binned into groups based on probability distributions, such as Tweedie distributions, to generate Tweedie shift indicators. As a further example, binning may include "smart binning," which includes the use of a decision tree to group together variables that may indicate similar shifts. Transforming variables may also include generating a plurality of shift indicators on a continuous scale or spectrum, to generate continuous shift indicators. Continuous shift indicators may include, for example, numeric or percentile values.

Transforming variables into a plurality of shift indicators may include, or may be followed by, sorting members of the first group into sub-groups based whether the members of the group are characterized by similar shift indicators. Advantageously, transforming variables into a plurality of shift indicators before, e.g., generating a machine learning model using the variables may improve model performance, because the characterization of the variables and potential simplification of the information provided by variables is controllable. Moreover, different variables that characterize a group may correlate with one another in complex ways. Transforming variables into shift indicators may provide opportunities for bivariate insights between two different variables, or between a target variable and an actual variable.

Step 204 may be performed by, e.g., hub 40, data pipelines 22, or modeling components 30 of system 10. In some embodiments of the present disclosure, an aspect of system 10 may be configured to output transformed variables and/or sorted members of the first group to e.g., a user, a processor, or other component. Outputting the transformed variables may advantageously allow for further analysis or insights regarding correlations and characteristics of members of the first group, and/or the variables.

According to step 206, a machine learning model may be generated using the plurality of shift indicators and the first group. In some embodiments, this step may include using a "base" or standard machine learning algorithm or technique known in the art, and adapting it based on the plurality of shift indicators and the first group. In such embodiments, any base machine learning algorithm or technique may be suitable for use with this method, as long as the machine learning algorithm or technique is configured to provide predictions. Examples of suitable base machine learning algorithms or techniques include gradient boosting machine (GBM) techniques, or random forest techniques.

Step 206 may further include, e.g., identifying a type of target output (e.g., a target variable or target shift indicator) based on the plurality of shift indicators and/or the first group, and providing a modeling component (e.g., modeling component 30 of system 10) with the type of target output, the first group, and the plurality of shift indicators. The modeling component may then fit an initial machine learning model with the provided information.

According to step 208, a plurality of hyperparameters for the machine learning model may be identified. This may include using, e.g., cross-validation processes and/or early stopping processes to assess how the machine learning model uses the initially provided information to generate predictions. Hyperparameters may be identified based on the model's performance using the initially provided information, and may be used to alter and/or tune the machine learning model's performance. In some embodiments, hyperparameters also may be tuned, until hyperparameters that optimally improve performance of the machine learning model are found.

According to step 210, the machine learning model may be modified using the plurality of hyperparameters, to generate a modified machine learning model. As a part of this step, identified hyperparameters may be provided to, e.g., modeling components 30 of system 10 to modify the machine learning model's performance and function. In some embodiments, the machine learning model's performance may be measured and logged by, e.g., modeling components 30 of system 10.

FIG. 2B illustrates, in flow chart form, steps in a method 250 for using predictions from a generated machine learning model to determine impacts of shift indicators on population and performance shifts, according to aspects of the present disclosure. According to step 252, a second group may be predicted using a machine learning model (e.g., the modified machine learning model generated in method 200) and the first group. This may be performed by, e.g., modeling components 30 of system 10, and/or any other processor or computing component which may run a machine learning model. In some embodiments, this step may be performed by the machine learning model, and may include predicting variables that may characterize members of a second group. In some embodiments, this step may further include predicting, using the machine learning model, a plurality of shift indicators that may characterize members of the second group, using the predicted variables. These predictions may be made, e.g., using the first group and the shift indicators transformed from the variables that characterize the first group.

According to step 254, an aggregate population shift and an aggregate performance shift may be determined between the first group and an actual second group, using one or more of the first group, the predicted second group, and an actual second group. This may be performed by, e.g., modeling components 30 of system 10, and/or any other suitable processor or computing component. The actual second group may be identified in various ways, e.g., depending on a desired analysis and the first group. For example, if a desired analysis relates to customer satisfaction with respect to a given retailer, and if the first group includes a population of customers of the retailer at a given time period, the actual second group may include a population of customers of the retailer at a second time period. As another example, if a desired analysis relates to monitoring loss over time, and the first group includes a plurality of investments or loans made by a lender, the actual second group may include another plurality of investments or loans, e.g., made by the same lender. In some embodiments, the actual second group may be provided, e.g., by data sources 32, 34, 36 and/or hub 40 of system 10 to modeling components 30.

In some embodiments, the aggregate population shift may be determined by identifying differences in members of the first group and the actual second group. In some embodiments, the aggregate performance shift may be characterized by, e.g., any changes between the first group and the actual second group that are not attributable to the aggregate population shift. In further embodiments, the aggregate performance shift may be characterized by, e.g., changes in selected variables between the first group and the actual second group, reflecting a change in performance (e.g., changes in satisfaction levels, loans, losses, gains, etc.).

In some embodiments, the aggregate population shift may be determined using a difference between a predicted population shift and the actual population shift observed between the first group and the actual second group. This may be performed by, e.g., modeling components 30 of system 10, and/or any other suitable processor or computing component. A predicted population shift may be determined by, e.g., a generated machine learning model (e.g., generated according to method 200) or other suitable processing component, using comparisons between the first group and a predicted second group (e.g., predicted according to step 252). In some embodiments, subtraction of a predicted population shift from the actual population shift may provide the aggregate population shift.

In some embodiments, an aggregate performance shift may be determined using a difference between a predicted performance shift and an actual performance shift observed between the first group and the actual second group. A predicted performance shift may be determined by, e.g., a generated machine learning model, using comparisons between the first group and the predicted second group (e.g., predicted according to step 252). This also may be performed by, e.g., modeling components 30 of system 10, and/or any other suitable processor or computing component. In some embodiments, subtraction of the predicted performance shift from the actual performance shift may provide the aggregate population shift.

According to step 256, simulation of shift indicators may be used to determine a marginal impact of one or more first shift indicators on a change in a target variable (e.g., a change in a variable of interest between the first group and the actual second group). This also may be performed by, e.g., modeling components 30 of system 10, and/or any other suitable processor or computing component. Determining a marginal impact of one or more first shift indicators on a change in a target variable may allow for analysis of reasons as to why there may be differences between the first group and the actual second group. This may be determined by, e.g., identifying one or more shift indicators associated with a sample set of the actual second group, where the sample set is characterized by changes in a target variable's value(s) (e.g., a variable of interest to an analysis) as compared to its (or their) corresponding value(s) in a corresponding sample set of the first group. A comparison of the sample set in the actual second group to the total members of the actual second group may provide an estimated marginal impact of the identified one or more shift indicators.

According to step 258, an impact of each of the one or more first shift indicators on the aggregate population shift may be determined by multiplying the marginal impact of each shift indicator with a difference in the shift indicator between the first group and the actual second group. For example, each of the one or more first shift indicators may be determined for both the first group and the actual second group, and, for each of the one or more first shift indicators, a difference in the shift indicator between the first group and the actual second group may be determined. This difference may be multiplied by the marginal impact of the shift indicator to determine an impact of the shift indicator on the aggregate population shift. Steps 256 and 258 may be performed a number of times, e.g., to identify a marginal impact of each of a plurality of first shift indicators and their corresponding impacts on the aggregate population shift.

According to step 260, the one or more first shift indicators may be converted to a plurality of variables. This step may include, e.g., a process opposite to step 204 of method 200. For example, the one or more first shift indicators may each be associated with one or more variables from which the shift indicator(s) was (or were) generated. These associated variables may be identified, such that a correlation between an impact of one or more first shift indicators and a variable may be identified (e.g., the impact of the one or more first shift indicators may be indicative that a variable associated with the one or more first shift indicators is responsible for, or is otherwise correlated with, that impact).

According to step 262, the converted plurality of variables may be ranked from the most significant to the least significant, to determine variables associated with the greatest impact on the aggregate population shift. This step may include, e.g., identifying which of the converted variables are associated with one or more first shift indicators having the greatest impact and ranking those variables as most significant, identifying which of the converted variables are associated with one or more first shift indicators having the second-greatest impact and ranking those variables as second most significant, etc. The variables associated with one or more first shift indicators having greater impacts on the aggregate population shift may also themselves have the greatest impact on the aggregate population shift.

The number of variables ranked in this manner may depend on a plurality of considerations, such as a level of detail desired in an analysis, a level of impact of each individual variable or each individual first shift indicator, and/or a desired number of identified variables provided by, e.g., a user of user device 14 or other individual. In some embodiments, step 262 may include identifying a plurality of variables having the greatest relative impact on the aggregate population shift.

In some embodiments, one or more of the ranked variables having an impact on the aggregate population shift may be output. This may include, e.g., modeling components 30 returning a ranked variable and its corresponding impact to, e.g., hub 40 of system 10. Hub 40 of system 10 may, in turn, provide an output of a variable and its corresponding impact to, e.g., user device 14 and/or scheduler 18. In embodiments where a plurality of variables and their impacts on the aggregate population shift have been determined and ranked, step 262 may include outputting each of the variables and their corresponding impacts on the aggregate population shift. In some embodiments, this step also may include providing a notification to a user device (e.g., user device 14) from scheduler 18 that the variable(s) and its (or their) corresponding impact(s) are available for viewing.

According to step 264, a sub-sample of the actual second group may be identified, wherein the sub-sample is defined by one or more second shift indicators. This also may be performed by, e.g., modeling components 30 of system 10, and/or any other suitable processor or computing component. This step may include, e.g., identifying a shift indicator associated with a sub-sample (e.g., a subset or smaller portion) of the actual second group, where the shift indicator associated with each member of the sub-sample exhibits a change as compared to its corresponding value associated with a member of the first group.

According to step 266, a partial performance change for each identified sub-sample may be calculated, and each identified sub-sample may be ranked based on its calculated partial performance change to determine an impact of each of the one or more second shift indicators on the aggregate performance shift. This also may be performed by, e.g., modeling components 30 of system 10, and/or any other suitable processor or computing component. A calculated partial performance change may be equivalent to, e.g., a calculated aggregate performance shift for the sub-sample, where the aggregate performance shift is based on changes in shift indicators between the sub-sample in the first group and the same sub-sample in the actual second group. In some embodiments, a comparison of the partial performance change of the sub-sample to the aggregate performance shift of the actual second group may provide insight as to whether one or more second shift indicators associated with the sub-sample may be correlated with, associated with, or responsible for a proportionally greater or smaller amount of the aggregate performance shift of the actual second group.

In some embodiments, partial performance changes and the one or more second shift indicators associated with the sub-samples showing those partial performance changes may be ranked, such that the one or more second shift indicators associated with the greatest excess performance changes may be identified. In some embodiments, this process may be iterative. For example, after identifying a sub-sample associated with the greatest partial performance change, an iterative process may include removing that sub-sample from a repeated iteration of step 266, to allow for better identification of a sub-sample associated with the next greatest partial performance change. As each sub-sample may be associated with one or more second shift indicators, this process (either iteratively or non-iteratively) may allow for identification of a plurality of second shift indicators having relatively greater impacts on an aggregate performance shift between the first group and the actual second group.

The number of identified second shift indicators may depend on a plurality of considerations, such as a level of detail desired in an analysis, a level of impact of each individual shift indicator, and/or a desired number of identified shift indicators provided by, e.g., a user of user device 14 or other individual.

One or more of the identified second shift indicators may be output. For example, one or more of the identified second shift indicators having relatively greater impacts on an aggregate performance shift between the first group and the actual second group may be output. This step may include, e.g., modeling components 30 returning a shift indicator and its corresponding impact to, e.g., hub 40 of system 10. Hub 40 of system 10 may, in turn, provide an output of the shift indicator and its corresponding impact to, e.g., user device 14 and/or scheduler 18. In embodiments where a plurality of shift indicators and their impacts on the aggregate performance shift have been determined, each of the determined shift indicators and their corresponding impacts on the aggregate performance shift may be output. In some embodiments, this step also may include providing a notification to a user device (e.g., user device 14) from scheduler 18 that the shift indicator(s) and its (or their) corresponding impact(s) are available for viewing. In some embodiments, a plurality of shift indicators and their corresponding impacts on either the aggregate population shift or the aggregate performance shift may be output simultaneously.

In some embodiments, output according to the present method may include, e.g., generating a display, such as a list, chart, table, or visual display indicating the output information. FIGS. 4A-4D depict exemplary waterfall charts which may be generated by, e.g., one or more aspects of system 10 as a part of an output step. Such waterfall charts may be generated by, e.g., hub 40 or API 16 for display on, e.g., user device 14.

FIG. 3 depicts, in an alternative flow chart form, steps in a method 100 for generating and using a machine learning model to predict and evaluate data according to aspects of the present disclosure. According to step 110, data 102 for a first group and data 104 for a second group may undergo a binning process 106, including numerical and categorical binning. Flow then proceeds to machine learning step 120. According to step 122, a machine learning model may be generated and tuned using the first group data 102. According to step 124, the machine learning model and the first group data 102 may be used to form predictions on second group data. According to step 130, and as illustrated by chart 140, an aggregate population shift may be determined (step 132), and an aggregate performance shift may be determined (step 134). According to step 150, the population shift may be decomposed (step 152) and the performance shift may be decomposed (step 154). This may include, e.g., steps such as steps 262 and 266, described earlier with respect to FIG. 2B. More generally, this step may include any method of identifying particular correlations between particular variables, shift indicators, and performance and/or population shifts.

Chart 140 illustrates an exemplary comparison of data for a predicted second group to data for an actual second group. As depicted in Chart 140, in some embodiments it may be assumed that predicted and actual data for a first group (144 and 142, respectively) are equivalent. A difference between a predicted second group 146 and an actual/predicted first group 142, 144 may, in some embodiments, be equivalent to an aggregate population shift, if it is assumed that performance remains constant between the two groups. A difference between an actual second group 148 and a predicted second group 146 may be equivalent to an aggregate performance shift—e.g., an aggregate shift in variables due to reasons other than a population shift.

According to step 150, the population shift may be decomposed (step 152) and the performance shift may be decomposed (step 154). Decomposing the population shift and the performance shift may include identifying shift indicators and/or variables that may correlate with and/or have an effect on the population shift and/or the performance shift.

FIGS. 4A-4D illustrate exemplary waterfall charts displaying two sets of data, as well as population shifts, performance shifts, and variables influencing differences between the two sets of data, according to aspects of the present disclosure.

Figure 4A:
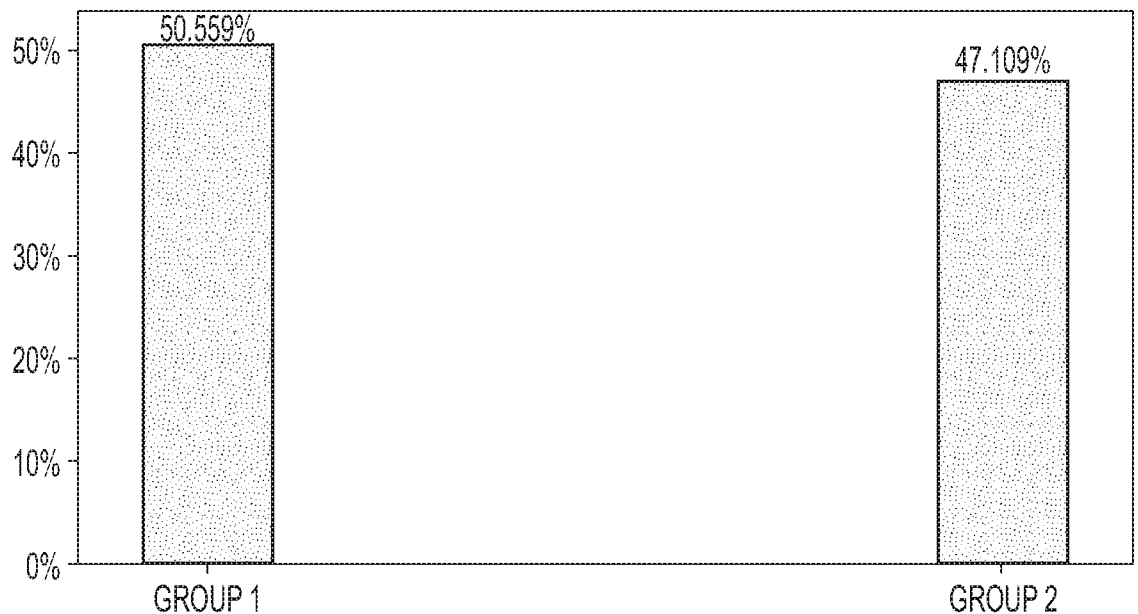
FIGS. 4A-4D illustrate exemplary waterfall charts displaying two sets of data, as well as population shifts, performance shifts, and variables influencing differences between the two sets of data, according to aspects of the present disclosure.
Figure 4B:
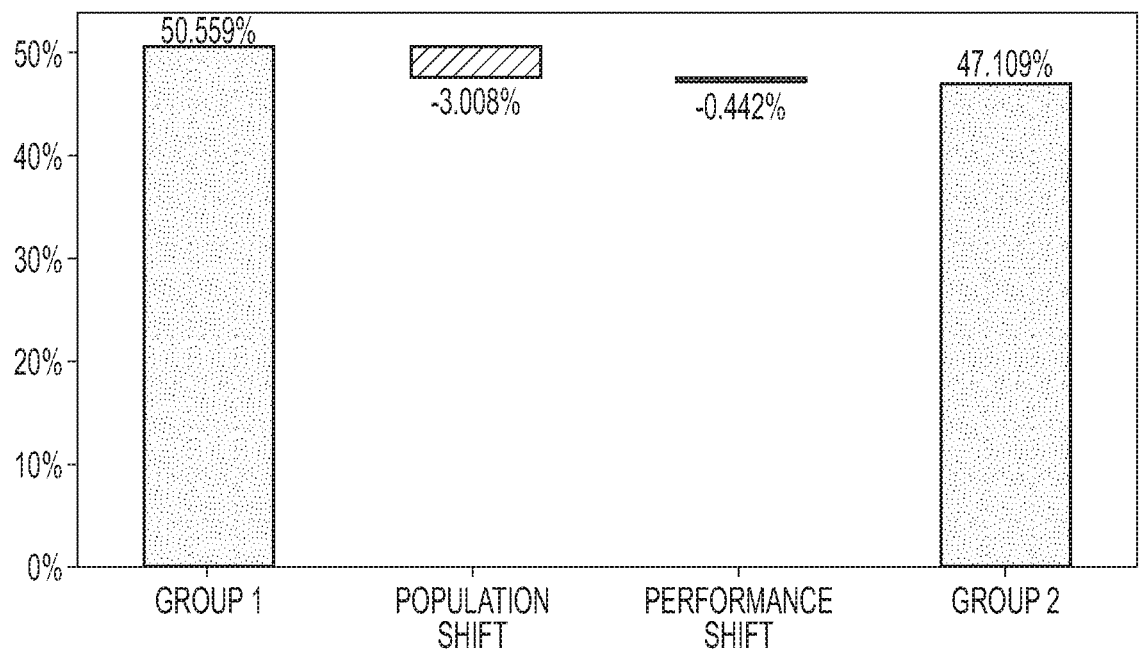
Figure 4C:
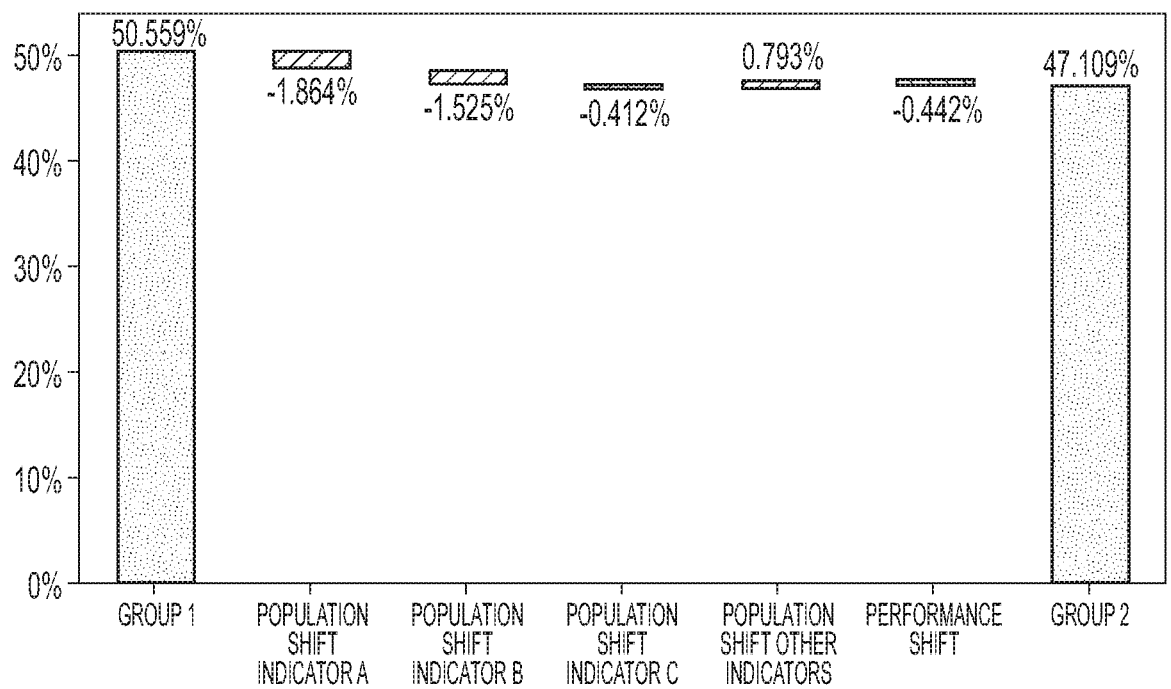
Figure 4D:
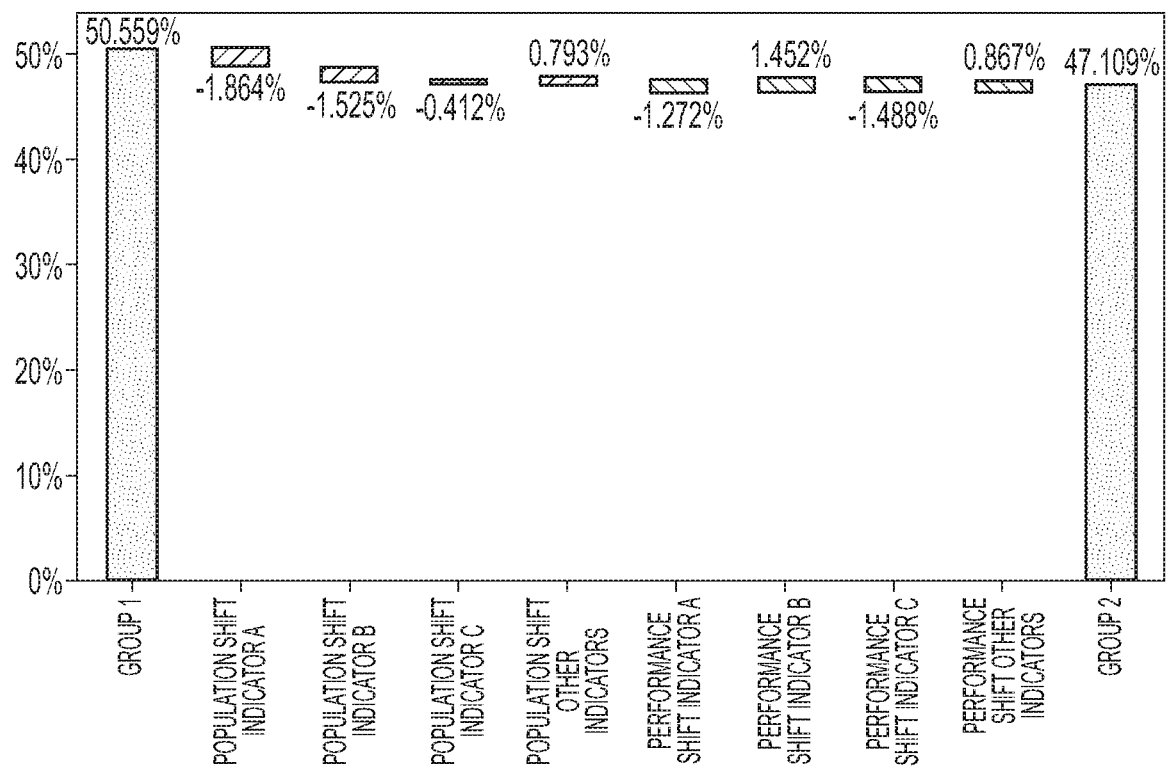

FIG. 4A depicts a chart showing bars for a first group ("Group 1") and a second group ("Group 2"), each represented by an overall metric (a percentage, as shown on the y-axis). As shown, there is an overall difference of 3.45 percentage points between the "Group 1" and "Group 2" bars. FIG. 4B depicts a waterfall chart showing the same bars as depicted in FIG. 4A. Additionally, a population shift bar represents a difference between the "Group 1" and "Group 2" bars which is attributable to a population shift, and a performance shift bar represents a difference between the "Group 1" and "Group 2" bars which is attributable to a performance shift. FIG. 4C depicts a more detailed waterfall chart, in which the population shift bar has been decomposed into multiple bars, each representing a different population shift indicator that has influenced the difference between "Group 1" and "Group 2". FIG. 4D depicts a still further detailed waterfall chart, in which the performance shift bar has also been decomposed into multiple bars, each representing a different performance shift indicator that has influenced the difference between the "Group 1" and the "Group 2".

Each of FIGS. 4A-4D is illustrative of a type of output which may result from the processes and methods disclosed with respect to, e.g., FIGS. 2A, 2B, or 3. In particular, FIGS. 4C and 4D illustrate one way of depicting shift indicators and their relative impact on performance shifts and population shifts. Moreover, FIGS. 4A-4D depict a progression from data representing two groups to data representing the two groups and the population and performance shifts between the two groups, to data representing the two groups and the shift indicators and their relative impacts on a difference between the two groups.

In general, any process or method discussed in this disclosure that is understood to be performable by a computer may be performed by one or more processors. Such processors may be located in, for example, one or more of the components of system 10, depicted in FIG. 1. The one or more processors may be configured to perform the processes or methods disclosed herein by instructions (computer-readable code) that, when executed by the processors, cause the one or more processors to perform the processes. The instructions also may be stored on a non-transitory computer-readable medium.

In the above description, various aspects of the disclosed systems and methods are sometimes grouped together in a single embodiment, figure, or description thereof for the purpose of streamlining the disclosure and aiding in the understanding of one or more of the various inventive aspects. This is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, combinations of features of different embodiments disclosed herein are intended to be within the scope of the present disclosure, as would be understood by those skilled in the art. Thus, while certain embodiments have been described, those skilled in the art will recognize that other and further modifications may be made thereto without departing from the spirit of the invention. For example, functionality may be added or deleted from the block diagrams and flow charts provided herewith. Moreover, steps of the methods disclosed herein may be added, deleted, or performed out of their depicted order.

The above disclosed subject matter is to be considered illustrative, and not restrictive, and the appended claims are intended to cover all modifications, enhancements, and implementations that fall within the true spirit and scope of the present disclosure. Thus, to the maximum extent allowed by law, the scope of the claims is to be determined by their broadest permissible interpretation. While various implementations of the disclosure have been described, it will be apparent to those of ordinary skill in the art that many more implementations are possible within the scope of the disclosure.

What is claimed is:

1. A computer-implemented method for generating a machine learning model to define differences between two groups, the method comprising:
    receiving a plurality of variable values that characterize members of a first group, wherein the members of the first group comprise a first population exhibiting a first loss of monetary assets over a first period of time;
    generating a plurality of shift indicators attributable to each of the members of the first group by sorting the received variable values into categories of similar values, and transforming each category of similar values into a simplified numerical value, wherein each simplified numerical value is a shift indicator of the plurality of shift indicators, and wherein there are fewer shift indicators than received variable values;
    generating a machine learning model using the plurality of shift indicators and the first group, wherein the machine learning model is configured to predict a second group comprising a predicted second population exhibiting a predicted second loss of monetary assets over a second period of time, a population shift representing a change in population between the first group and the predicted second group, and a performance shift representing a difference in one or more of the shift indicators, the difference representing a change in at least one variable value characterizing a member of the first group who is also a member of the predicted second group;

modifying the machine learning model using a plurality of hyperparameters identified for the machine learning model to generate a modified machine learning model;

using the modified machine learning model and the first group, generating the predicted second group, the predicted population shift, and the predicted performance shift;

using one or more of the plurality of shift indicators, the first group, and an actual second group, the actual second group comprising an actual second population exhibiting an actual second loss of monetary assets over the second period of time, determining an actual population shift representing a change in population between the first group and the actual second group, and an actual performance shift representing a difference in one or more of the plurality of shift indicators, the difference representing a change in at least one variable value characterizing a member of the first group who is also a member of the actual second group;

using a difference between the predicted population shift and the actual population shift, determining an aggregate population shift;

using a difference between the predicted performance shift and the actual performance shift, determining an aggregate performance shift; and outputting the aggregate population shift and the aggregate performance shift.

2. The computer-implemented method of claim 1, wherein the plurality of variable values that characterize members of the first group comprises loss percentages associated with loss of monetary assets.

3. The computer-implemented method of claim 1, wherein generating the plurality of shift indicators attributable to the first group further comprises:
transforming a received variable value into a binary value.

4. The computer-implemented method of claim 1, wherein the machine learning model is one of a gradient boosting model or a random forest model.

5. The computer-implemented method of claim 1, further comprising:
estimating, for a first shift indicator of the plurality of shift indicators, a coefficient of impact on the aggregate population shift; and
using the aggregate population shift and the estimated coefficient of impact for the first shift indicator, determining an impact of the first shift indicator on the aggregate population shift.

6. The computer-implemented method of claim 5, further comprising:
comparing the impact of the first shift indicator on the aggregate population shift with an impact of at least one other shift indicator on the aggregate population shift; and
if the impact of the first shift indicator is greater than the impact of the at least one other shift indicator, outputting the first shift indicator.

7. The computer-implemented method of claim 1, further comprising:
identifying a sub-sample of the actual second group associated with a first shift indicator of the plurality of shift indicators, wherein the first shift indicator associated with each member of the sub-sample exhibits a change as compared to its corresponding value associated with a member of the first group, wherein the exhibited change is a partial performance change; and
comparing the partial performance change to the aggregate performance shift to identify an impact of the first shift indicator on the aggregate performance shift.

8. The computer-implemented method of claim 7, further comprising:
comparing the impact of the first shift indicator on the aggregate performance shift with an impact of at least one other shift indicator on the aggregate performance shift; and
if the impact of the first shift indicator is greater than the impact of the at least one other shift indicator, outputting the first shift indicator.

9. The computer-implemented method of claim 1, wherein outputting the aggregate population shift and the aggregate performance shift comprises:
automatically generating a waterfall chart on a display, the waterfall chart including representations of the aggregate population shift, the aggregate performance shift, and at least one shift indicator contributing to the aggregate population shift and/or the aggregate performance shift.

10. The computer-implemented method of claim 1, wherein the plurality of hyperparameters are generated using at least one of cross-validation or early stopping on the machine learning model.

11. A computer-implemented method for generating a machine learning model to define aggregate changes between two groups, the method comprising:
identifying a plurality of variable values that characterize members of each of a first group and a second group, wherein members of the first group comprise a first population exhibiting a first loss of monetary assets over a first period of time;
generating a plurality of shift indicators by sorting the plurality of variable values into categories of similar values, and transforming each category of similar values into a simplified numerical value, wherein each simplified numerical value is a shift indicator of the plurality of shift indicators, and wherein there are fewer shift indicators than received variable values;
generating a machine learning model using the plurality of shift indicators and the first group, wherein the machine learning model is configured to predict a population shift representing a change in population between the first group and a predicted second group comprising a predicted second population exhibiting a predicted second loss of monetary assets over a second period of time, and a performance shift representing a difference in one or more of the plurality of shift indicators, the difference representing a change in at least one variable value characterizing a member of the first group who is also a member of the predicted second group;
identifying a plurality of hyperparameters for the machine learning model;
modifying the machine learning model using the plurality of hyperparameters to generate a modified machine learning model;

using the modified machine learning model and the first group, predicting a population shift and a performance shift between the first group and the predicted second group;

using one or more of the plurality of shift indicators, the first group, and an actual second group, the actual second group comprising an actual second population exhibiting an actual second loss of monetary assets over the second period of time, determining an actual population shift representing a change in population between the first group and the actual second group, and an actual performance shift representing a difference in a shift indicator, the difference representing a change in at least one variable value characterizing a member of the first group who is also a member of the actual second group, wherein the difference is not attributed to the actual population shift;

using a difference between the predicted population shift and the actual population shift, determining an aggregate population shift;

using a difference between the predicted performance shift and the actual performance shift, determining an aggregate performance shift;

estimating a coefficient of impact on the aggregate population shift for a first shift indicator of the plurality of shift indicators;

using the aggregate population shift and the estimated coefficient of impact on the aggregate population shift, determining a first impact of the first shift indicator on the aggregate population shift;

outputting the first shift indicator and the first impact of the first shift indicator on the aggregate population shift;

determining a second impact of a second shift indicator of the plurality of shift indicators on the aggregate performance shift; and outputting the second shift indicator and the second impact of the second shift indicator on the aggregate performance shift.

12. The computer-implemented method of claim 11, wherein identifying a plurality of hyperparameters for the machine learning model comprises:
using cross-validation and early stopping for the machine learning model.

13. The computer-implemented method of claim 11, wherein estimating a coefficient of impact on the aggregate population for a first shift indicator of the plurality of shift indicators comprises:
simulating a sample aggregate performance shift in a sample set of the actual second group, wherein the sample set of the actual second group includes fewer members than the actual second group and exhibits a change from a sample set of the first group, the change being associated with the first shift indicator.

14. The computer-implemented method of claim 11, wherein determining a first impact of the first shift indicator of the plurality of shift indicators on the aggregate population shift comprises:
multiplying the aggregate population shift by the estimated coefficient of impact on the aggregate population shift.

15. The computer-implemented method of claim 11, wherein calculating a second impact of a second shift indicator of the plurality of shift indicators on the aggregate performance shift comprises:
determining a sample aggregate performance shift in a sample set of the actual second group, wherein the sample set of the actual second group includes fewer members than the actual second group and exhibits a change from a sample set of the first group, the change being associated with the second shift indicator.

16. The computer-implemented method of claim 11, wherein the plurality of variable values that characterize members of each of a first group and a second group comprises values corresponding to at least one hundred variables.

17. The computer-implemented method of claim 11, wherein the plurality of shift indicators comprises binary shift indicators, Tweedie shift indicators, and continuous shift indicators.

18. The computer-implemented method of claim 11, further comprising:
measuring and logging performance of the modified machine learning model.

19. A non-transitory computer-readable medium storing instructions that, when executed by one or more processors of a computer system, cause the one or more processors to perform operations comprising:
identifying a plurality of variable values that characterize members of a first group, wherein the first group comprises a first population exhibiting a first loss of monetary assets over a first period of time, and wherein the plurality of variable values includes over one hundred values characterizing each member of the first group;

transforming the plurality of variable values into a plurality of shift indicators by sorting the variable values into categories of similar values, and transforming each category of similar values into a simplified numerical value, wherein each simplified numerical value is a shift indicator of the plurality of shift indicators, and wherein the plurality of shift indicators is fewer in number than the plurality of variable values;

generating a machine learning model using the plurality of shift indicators and the first group, wherein the machine learning model is configured to predict a second group comprising a predicted second population exhibiting a predicted second loss of monetary assets over a second period of time, a population shift representing a change in population between the first group and the predicted second group, and a performance shift representing a difference in one or more of the plurality of shift indicators, the difference representing a change in at least one variable value characterizing a member of the first group who is also a member of the predicted second group;

identifying a plurality of hyperparameters for the machine learning model;

modifying the machine learning model using the plurality of hyperparameters to generate a modified machine learning model;

using the modified machine learning model and the first group, predicting a second group, a population shift, and a performance shift;

using one or more of the plurality of shift indicators, the first group, and an actual second group, the actual second group comprising an actual second population exhibiting an actual second loss of monetary assets over the second period of time, determining an actual population shift representing a change in population between the first group and the actual second group, and an actual performance shift representing a difference in one or more of the plurality of shift indicators, the difference representing a change in at least one variable value characterizing a member of the first group who is also a member of the actual second group;

using a difference between the predicted population shift and the actual population shift and a difference between the predicted performance shift and the actual performance shift, determining an aggregate performance shift and an aggregate population shift;

determining a first impact of a first shift indicator on the aggregate population shift by simulating a sample aggregate population shift in a first sample set of the actual second group, wherein the first sample set exhibits a change from a sample set in the first group, the change being associated with the first shift indicator;

outputting the first shift indicator and the first impact of the first shift indicator on the aggregate population shift;

determining a second impact of a second shift indicator on the aggregate performance shift by calculating a sample aggregate performance shift in a second sample set of the actual second group, wherein the second sample set exhibits a change from a sample set of the first group, the change being associated with the second shift indicator; and outputting the second shift indicator and the second impact of the second shift indicator on the aggregate performance shift.

\* \* \* \* \*